July 7, 1953 C. R. ROGERS ET AL 2,644,283
HYDRAULIC PICKUP BALER
Filed June 5, 1948 11 Sheets-Sheet 1

INVENTORS.
Clifford R. Rogers,
Henry H. Kotzing,
John L. Heinlein,
By John P. Smith Atty.

July 7, 1953  C. R. ROGERS ET AL  2,644,283
HYDRAULIC PICKUP BALER
Filed June 5, 1948  11 Sheets-Sheet 5
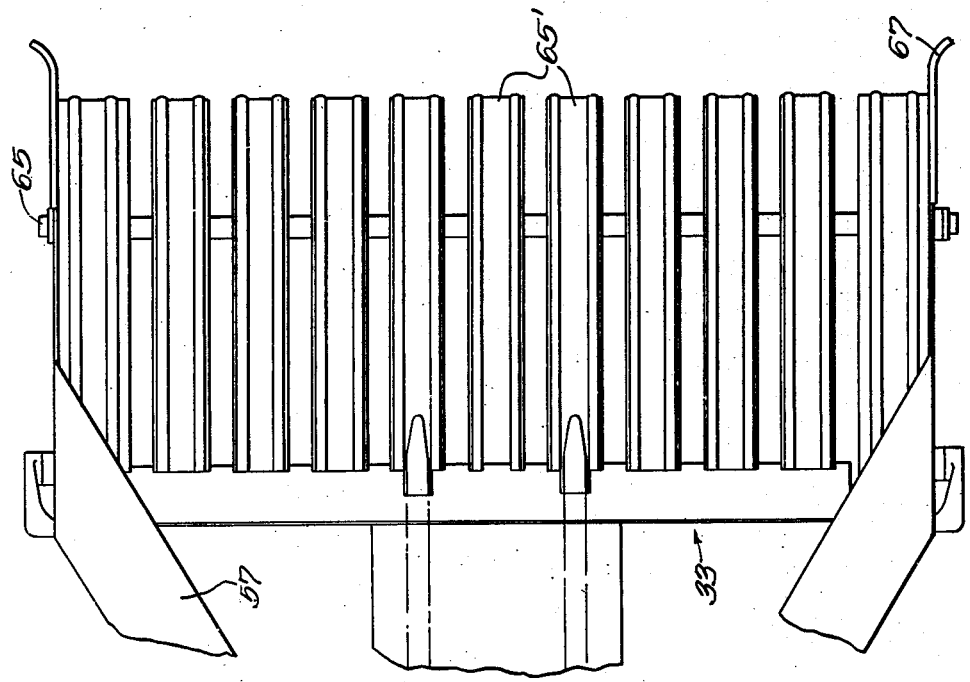
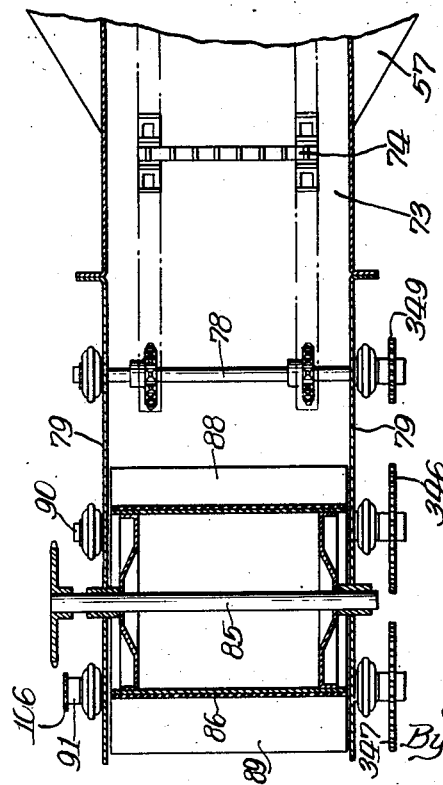
Fig. 5.
INVENTORS.
Clifford R. Rogers,
Henry H. Kotzing,
John L. Heinlein,
By John P. Smith
Atty.

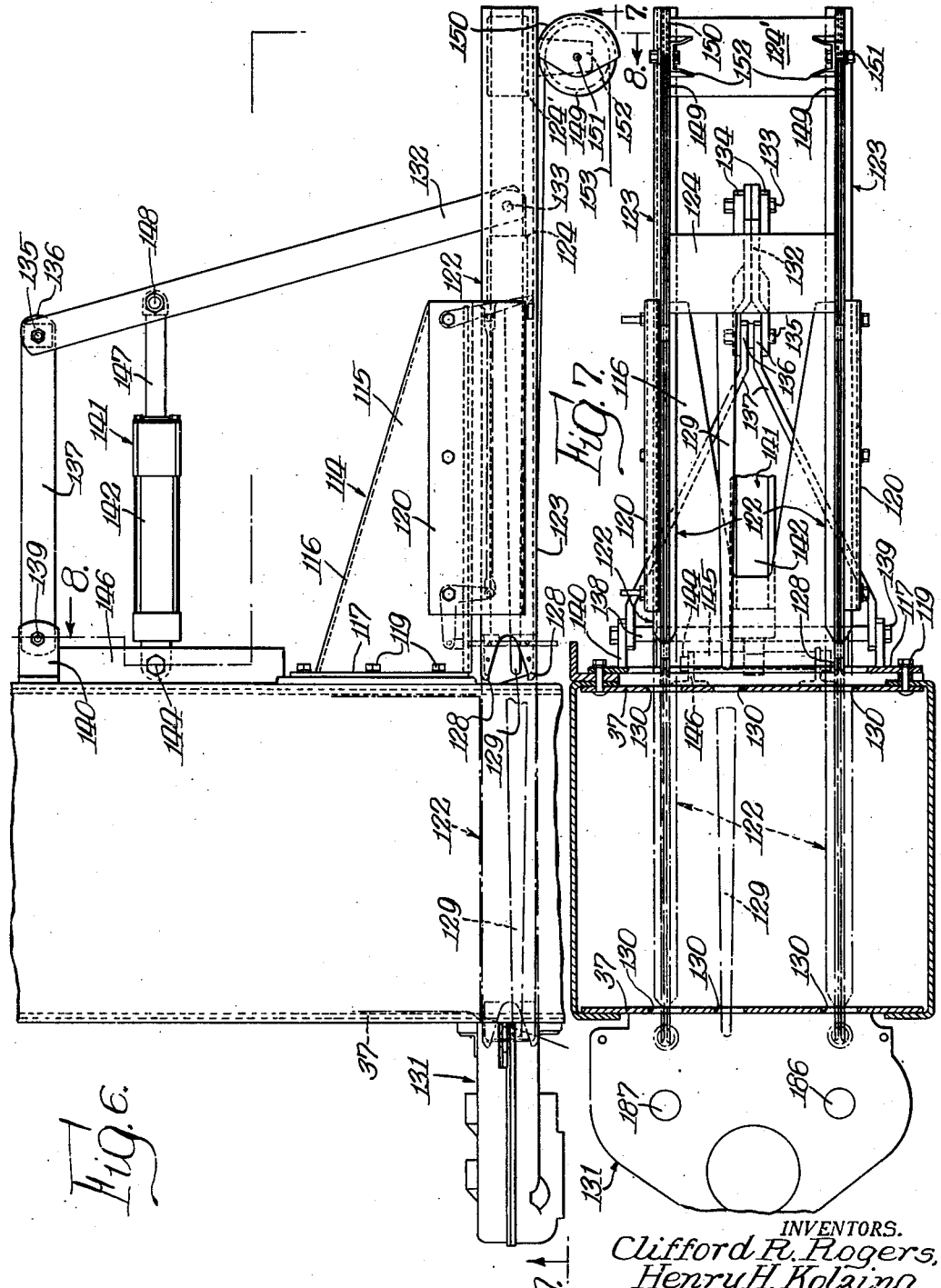

July 7, 1953
C. R. ROGERS ET AL
2,644,283
HYDRAULIC PICKUP BALER
Filed June 5, 1948
11 Sheets-Sheet 7
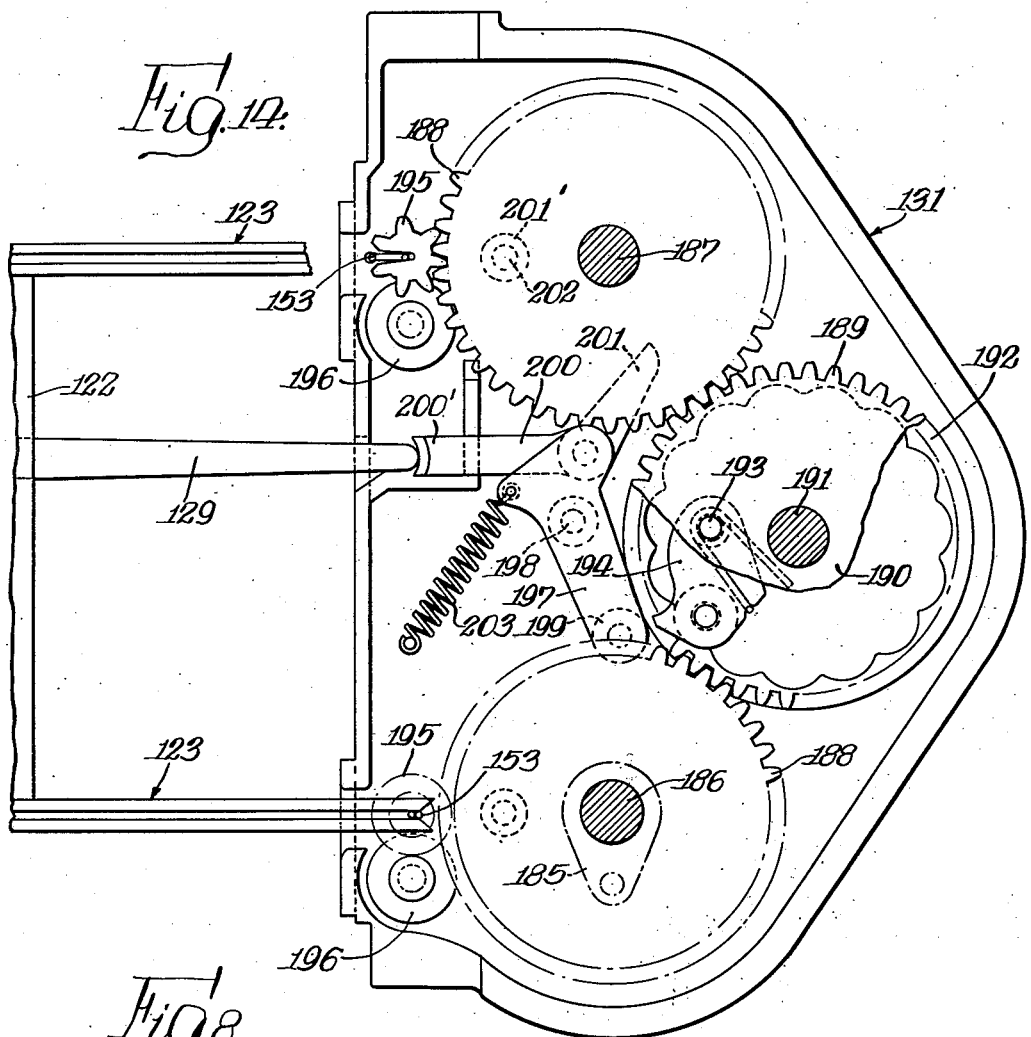
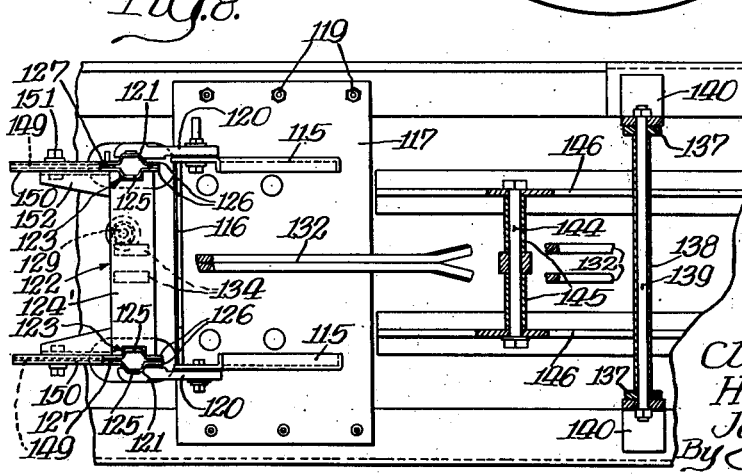
INVENTORS.
Clifford R. Rogers,
Henry H. Kolzing,
John L. Heinlein,
By John P. Smith Atty.

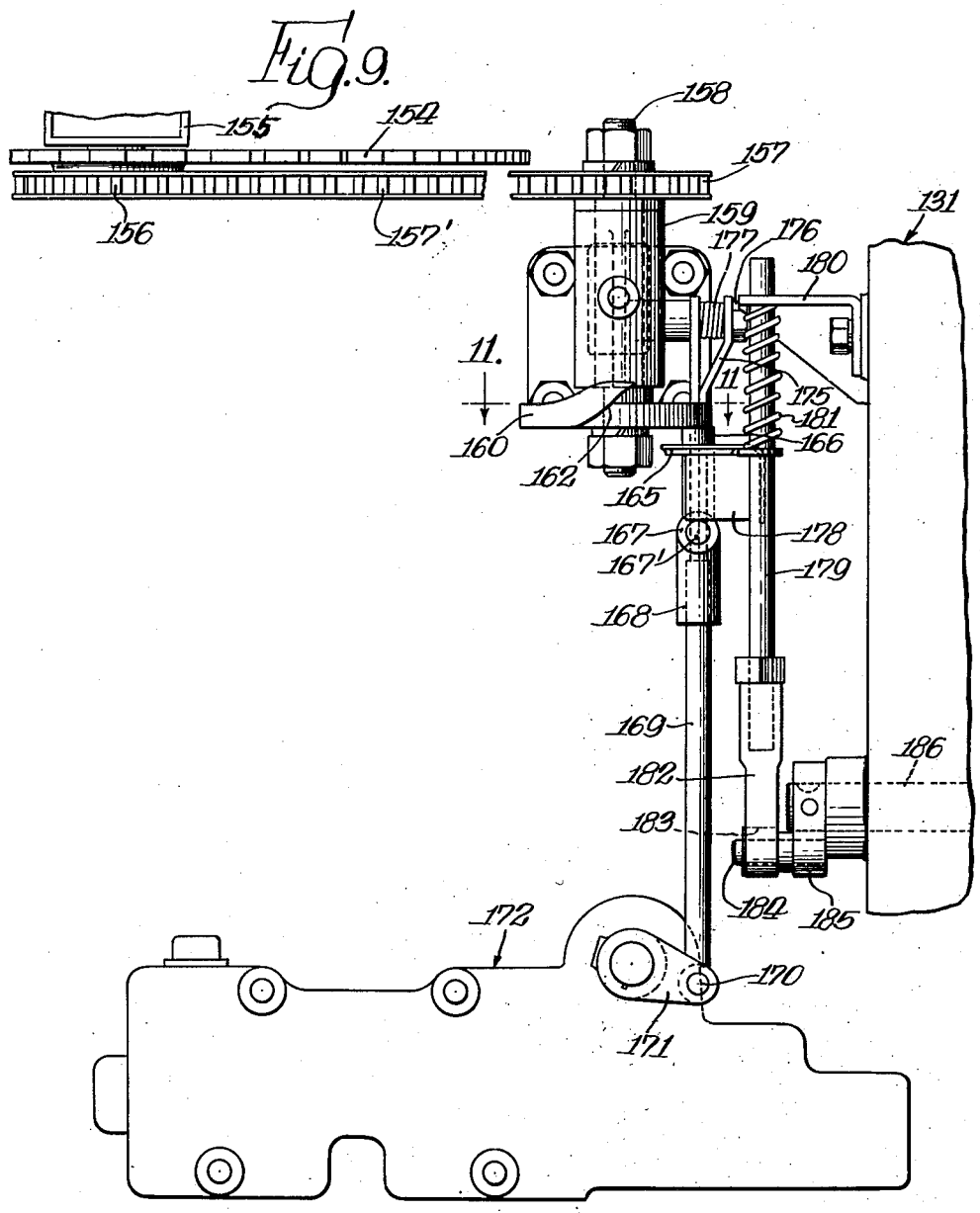

July 7, 1953
C. R. ROGERS ET AL
2,644,283
HYDRAULIC PICKUP BALER
Filed June 5, 1948
11 Sheets-Sheet 9
Fig. 10.
Fig. 11.
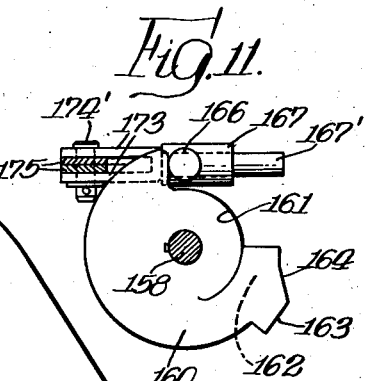
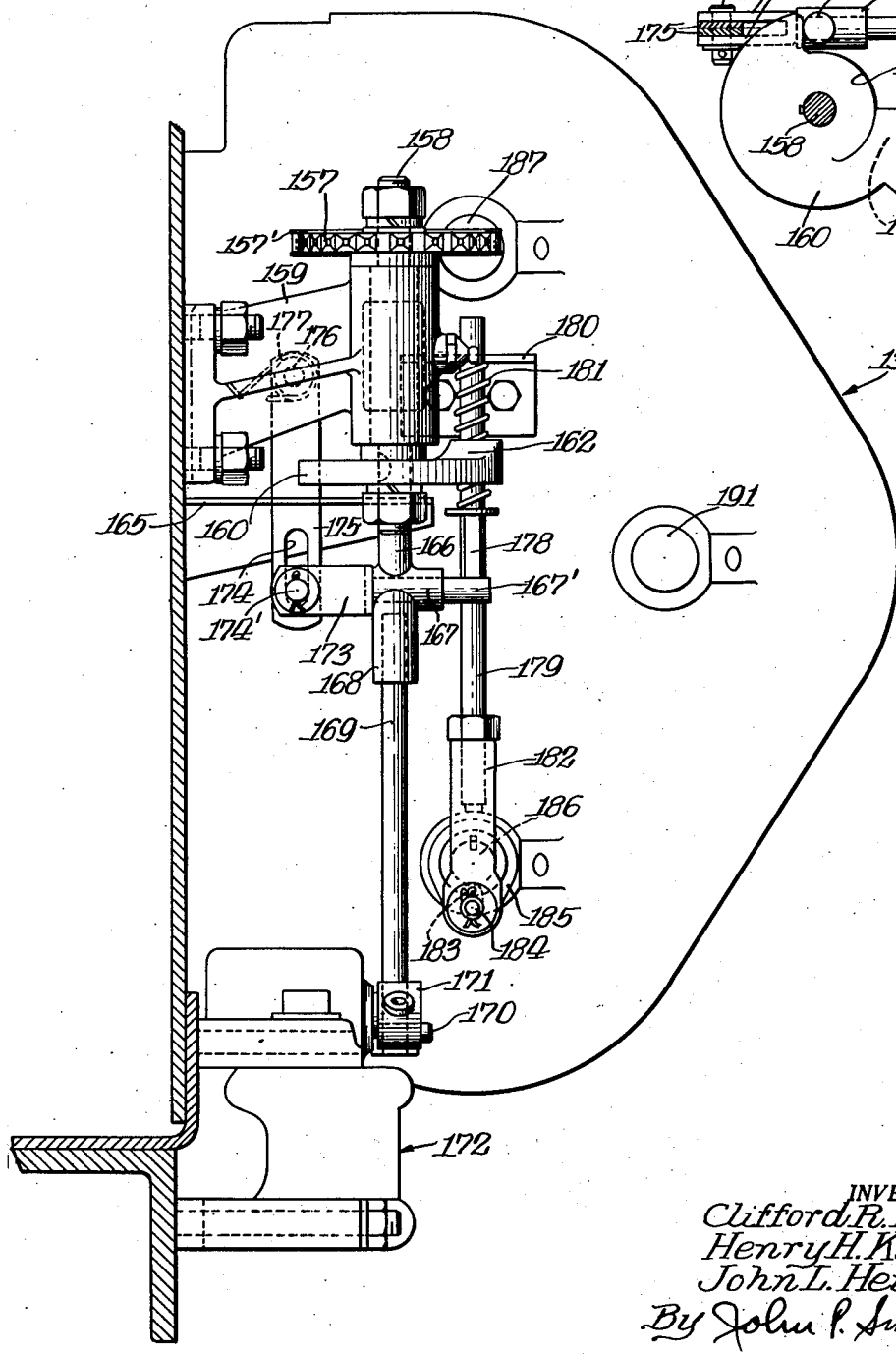
INVENTORS.
Clifford R. Rogers,
Henry H. Kotzing,
John L. Heinlein,
By John P. Smith
Atty.

July 7, 1953  C. R. ROGERS ET AL  2,644,283
HYDRAULIC PICKUP BALER
Filed June 5, 1948   11 Sheets-Sheet 10
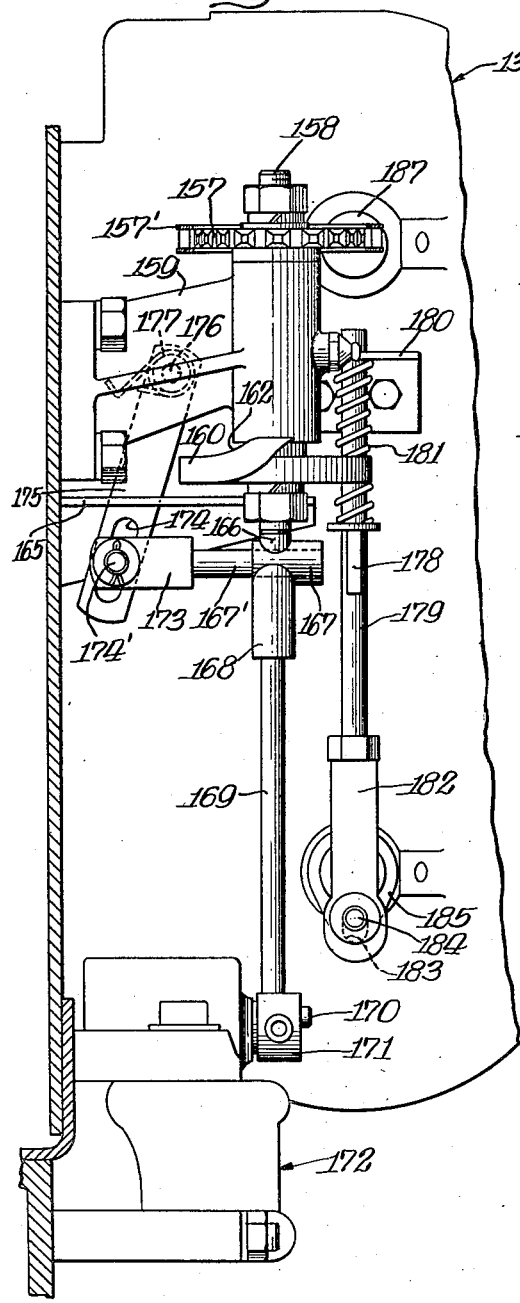
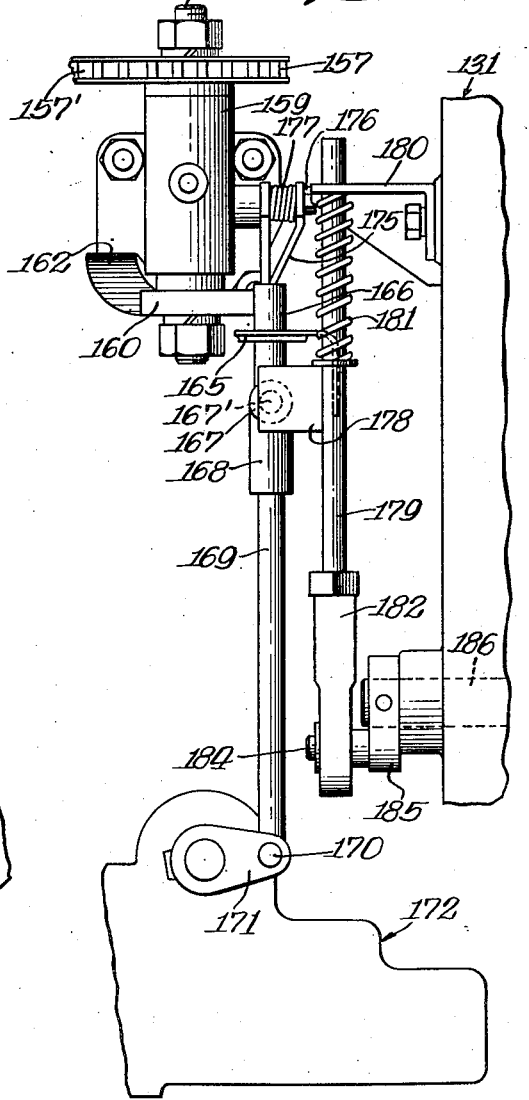
INVENTORS.
Clifford R. Rogers,
Henry H. Kotzing,
John L. Heinlein,
By John P. Smith Atty.

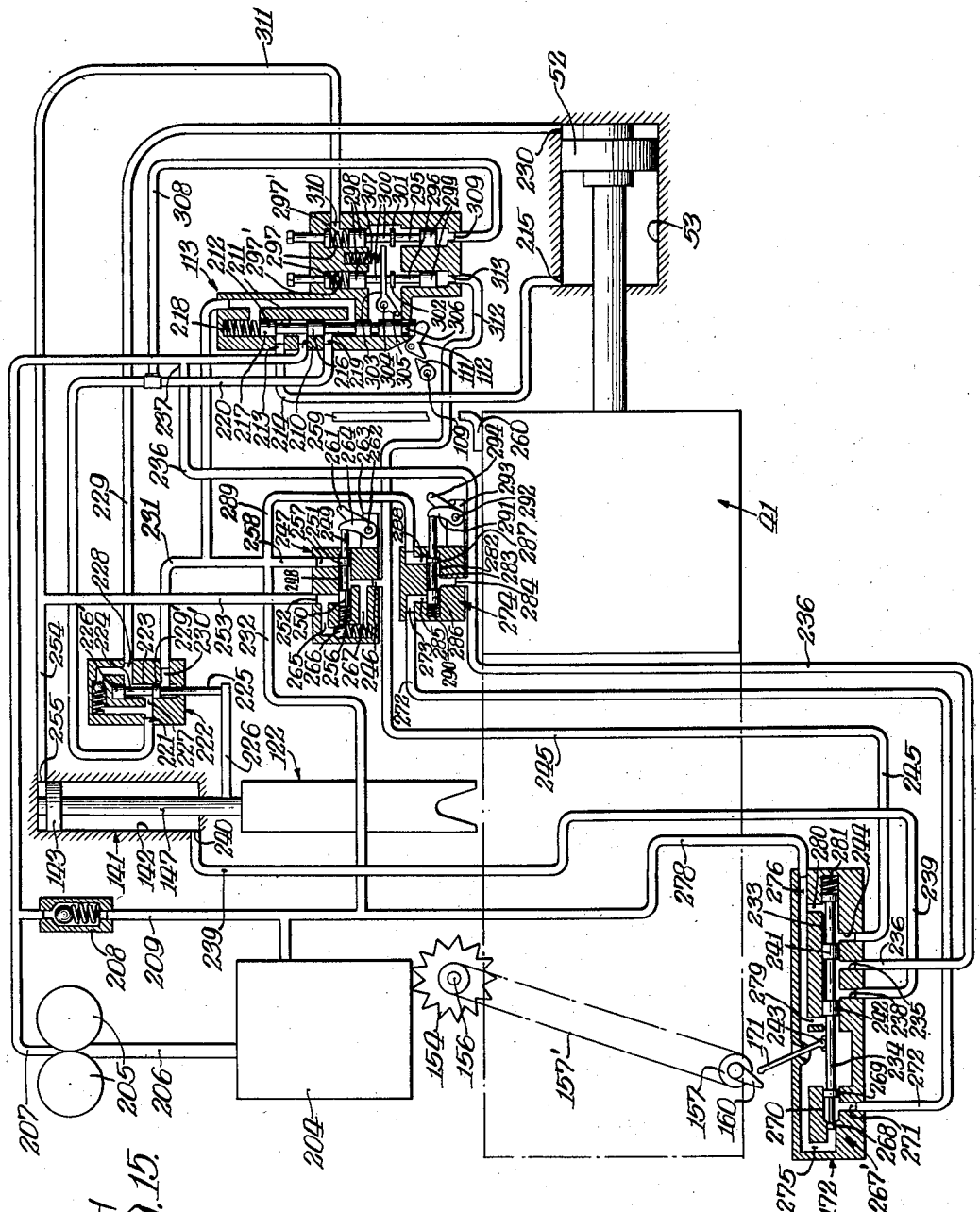

Patented July 7, 1953

2,644,283

UNITED STATES PATENT OFFICE 2,644,283

HYDRAULIC PICKUP BALER

Clifford R. Rogers, Henry H. Kolzing, and John L. Heinlein, Shelbyville, Ill., assignors to The Oliver Corporation, a corporation of Delaware Application June 5, 1948, Serial No. 31,308

24 Claims. (Cl. 56—10)

The present invention relates generally to balers, but more particularly to a novel and improved as well as simplified construction of a fully hydraulic pick-up baler.

One of the primary objects of the present invention is to provide a novel and improved, as well as simplified construction of a straight in line automatically operated and hydraulically actuated pick-up baler of the wire bound type in which the operation of the plunger and shuttle mechanism are synchronized and controlled by one another.

Another object of the present invention is to provide a novel and improved construction of a completely automatically controlled and actuated hydraulic baler of the wire knotting type in which the trip to control the actuation of the plunger is responsive to a pre-determined or measured amount of pre-compressed material fed into the baling chamber.

A further object of the invention is to provide a novel and improved hydraulically operated baler of the wire bound knot-tying type in which separate power hydraulic cylinders are employed to actuate the plunger and shuttle and in connection with which are separately actuated and controlled spool valves to synchronize the operation and control of the respective mechanisms.

A still further object of the invention is to provide a novel and improved straight-in-line baler of the pick-up type in which the longitudinal center of the pick-up and elevating mechanisms is in longitudinal alignment with the plunger and baling chamber.

A further object of the invention is to provide a novel economically constructed and fool-proof hydraulically actuated and controlled pick-up baler in which the weight of the complete baler is reduced by approximately fifty percent (50%) of the present conventional commercial baler.

A further object of the invention is to provide a straight-in-line baler in which the material fed thereto is gradually pre-compressed into a "ribbon" of material prior to being fed into the compression chamber of the baler.

These and other objects are accomplished by providing a construction and an arrangement of the various parts in the manner hereinafter described and particularly pointed out in the appended claims.

Referring to the drawings:

Fig. 3A is a fragmentary view showing the plunger trip mechanism;

Fig. 5 is a fragmentary cross sectional view taken on the lines 5—5 in Fig. 4;

Fig. 6 is an enlarged fragmentary top plan view of the shuttle mechanism;

Fig. 7 is a cross sectional view taken on the lines 7—7 in Fig. 6;

Fig. 8 is a fragmentary side elevational view taken on the lines 8—8 in Fig. 7;

Fig. 9 is a fragmentary side elevational view of the star wheel and trip mechanism which controls the shuttle;

Fig. 10 is an end elevational view of the same;

Fig. 11 is a fragmentary cross sectional view taken on the line 11—11 in Fig. 9;

Fig. 12 is a fragmentary view showing the parts in a different operating position;

Fig. 13 is a detailed view showing another position of the shuttle trip valve mechanism;

Fig. 14 is a fragmentary vertical cross sectional view of the wire twisting or tying mechanism; and Fig. 15 is a diagrammatic view of the hydraulic motors and control valves therefor.

Figure 1:
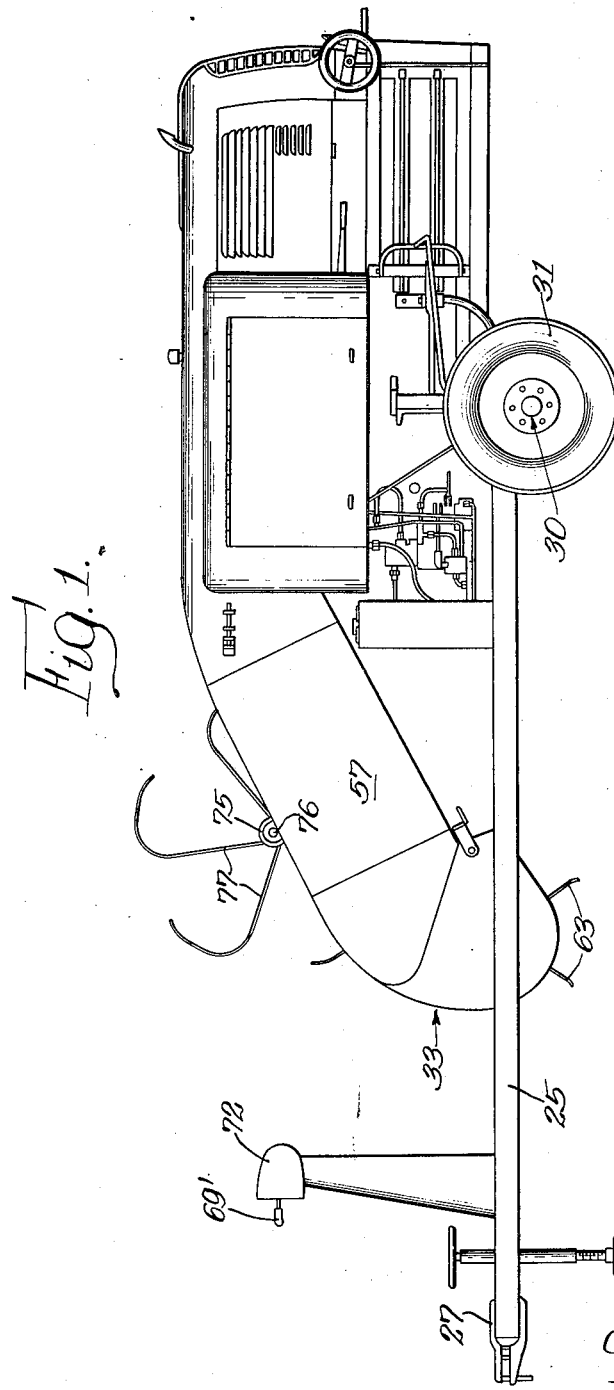
Fig. 1 is a side elevational view of our improved baler.

In illustrating one application of our invention, we have shown the same as comprising a main frame which includes two forwardly converging and laterally extending main or draft members 25 and 26. The forward end of these members are secured to a draft bracket 27 for attaching the same to a tractor. Suitable angular braces 28 and 29 brace the members 25 and 26 together. The rear ends of the members 25 and 26 are connected to the opposite ends of a transverse axle structure, generally indicated by the reference character 30. Journaled on the opposite ends of the axle structure are carrying wheels 31. Supported on and to one side of the axle structure 30 and secured to the main frame member 26 is a longitudinally extending baling and plunger chamber, generally indicated by the reference character 32. Located in longitudinal alignment with the baling and plunger chamber structure so as to form a "straight-in-line" type of baler, is a gathering or pick-up and conveying mechanism generally indicated by the reference character 33.

The baling chamber structure

The baling chamber structure includes two longitudinally extending main spaced apart angle members 34 upon which are secured two similar, but relatively smaller angle members 35. The baling chamber is housed in by a bottom sheet iron 36 and opposite side walls or sheet irons 37. The upper part of the baling chamber is reinforced by two spaced apart longitudinally extending angle members 38 and end angle members 39 and 40.

Plunger

Reciprocally mounted in the forward end of the baling chamber 32 is a plunger, generally indicated by the reference character 41. The rear face of the plunger 41 is provided with spaced apart horizontal recesses 42, 43, 44 for the accommodation of the shuttle mechanism hereinafter described.

Figure 4:
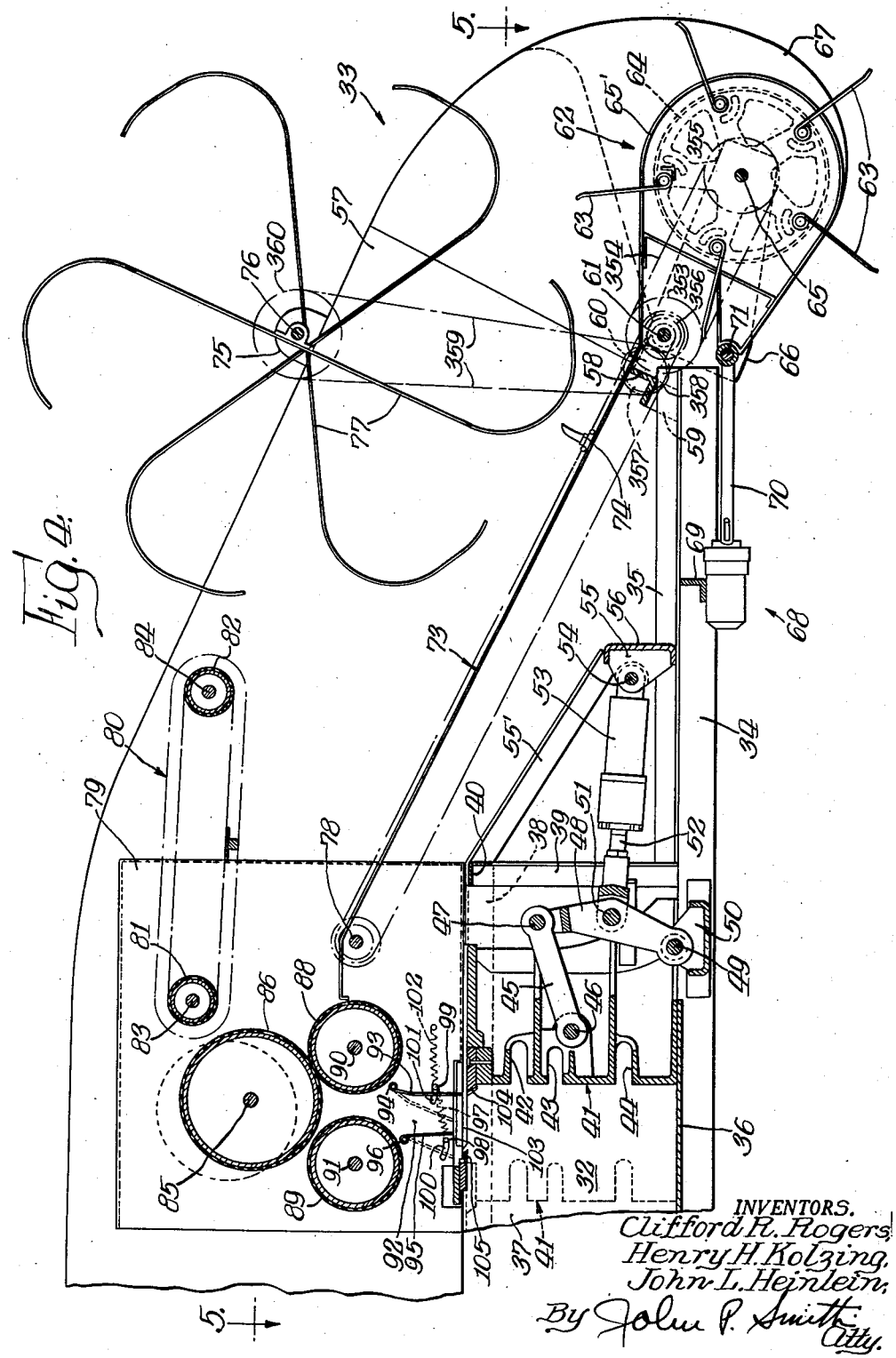
Fig. 4 is an enlarged fragmentary vertical cross section of the compressing rollers and the plunger.

The plunger in this case, like the shuttle mechanism, is hydraulically actuated and the manner and function of operation will hereinafter be more fully described. The plunger 41 in this case is actuated through a link mechanism which includes a link 45 which has one end pivoted to a pin 46 carried by the plunger 41. The other end of the link 45 is pivoted, as shown at 47, to one end of the lever 48. (See Fig. 4.) The other end of the lever 48 is pivoted, as shown at 49, to a transverse bracket 50. The transverse bracket 50 has its opposite ends secured to the opposite angle members 34. An intermediate portion of the lever 48 is pivotally connected, as shown at 51 to a hydraulically actuated piston 52 and cylinder 53. The forward end of the cylinder 53 is pivoted, as shown at 54, to a bracket 55. The bracket 55 is secured to a transverse channel 56 which has its opposite ends secured to the opposite angle members 35. The channel member 55 is reinforced by diagonal brace angles 55'.

Gathering pick-up mechanism

The gathering and pick-up mechanism is in longitudinal alignment with and positioned forwardly of the longitudinal center of the baling chamber and comprises two forwardly diverging walls 57 as extensions from the opposite vertical walls of the compression rolls housing hereinafter described. These diverging walls are supported on a transverse angle 58 which is secured to the forward ends of the longitudinally extending angle members 35 by brackets 59. (See Fig. 4.) Secured to the opposite ends of the angle 58 are forwardly projecting bearing brackets 60 in which a transverse shaft 61 is journaled. Pivotally mounted adjacent the opposite ends of the shaft 61 is a revolving pick-up mechanism, generally indicated by the reference character 62. This pick-up mechanism includes briefly a plurality of cam actuated spaced apart spring fingers 63 of the conventional type suitably supported on spaced apart spider wheels 64, which in turn, are secured to the opposite ends of a shaft 65. The spring finger 63 revolves between a plurality of spaced apart curved stripper guards 65'. The shaft 65 is journaled in opposite plates 66 which have their rear ends pivoted on the opposite ends of the shaft 61. Secured to the outside of the plates 66 are dividers or shields 67. The pick-up mechanism 62 is actuated or adjusted about its pivot on the shaft 61 with respect to the ground by a hydraulic mechanism, generally indicated by the reference character 68, which is secured to the angle member 34 by a bracket 69. The hydraulic mechanism 68 is operatively connected by a connection 70 to a transverse shaft 71 to which it is pivotally attached. The actuation of the hydraulic cylinder 68 is controlled by a manually actuated lever 69' which, in turn, controls a valve mounted within the control post 72 located within easy access to the operator on the tractor. Located between the gathering walls 57 is an upwardly and rearwardly inclined platform, generally indicated by the reference character 73, on which an endless conveyor 74 conveys the material in a direction toward the compression rollers. Rotatably supported on suitable oppositely disposed bearings 75 secured to the upper edges of the walls 57 is a reel shaft 76 to which is secured radially disposed curved reel arms 77 which are spaced laterally on the shaft 76 above the conveyor 74. The lower end of the conveyor 74 is trained about sprocket wheels (not shown) secured to the shaft 61 and the upper end of the conveyor is trained about sprocket wheels (not shown) secured to a shaft 78 journaled in suitable bearings in the opposite walls.

Pre-compression rolls

One of the essential features of the present invention embodies a novel construction and an arrangement which precompresses the material into the form of a "ribbon" of material prior to feeding the material into the compression chamber of the baler.

This construction includes oppositely disposed vertical plates 79 which are secured to the opposite angle members 38 and for vertical upward extensions of the vertical walls of the compression chamber 32 and support for the compression rollers. Positioned above the delivery end of the conveyor 74 is a horizontal feeder or endless conveyor generally indicated by the reference character 80. This feeder 80 is trained about suitable horizontally spaced apart rollers 81 and 82 which are secured to the respective shafts 83 and 84. Pivoted on the opposite ends of the shaft 83 are swinging arms 84'. Journaled in the rear ends of the arms 84' is a shaft 85 on which is secured a relatively large floating compression roller 86. Springs 87 attached to the arms 84' normally urge the roller 86 downwardly toward two relatively smaller and horizontally spaced apart compression rollers 88 and 89. (See Figs. 2 and 4.) The roller 86 is positioned at a point approximately vertically above the space between the two rollers 88 and 89. The rollers 88 and 89 are secured to shafts 90 and 91 respectively, which, in turn, are journaled in suitable oppositely disposed bearings (not shown) secured to the opposite plates 79. The shafts 90 and 91 are set a fixed distance between one another which, in turn, determines the "thickness" of the "ribbon" or the extent of the precompression of the material passing between the periphery of the rollers 88 and 89. (See Fig. 4.) The compression rollers 88 and 89 and the floating roller 86 are rubber covered. All of these rollers are of a length equal to that of the width of the baler chamber. (See Figs. 4 and 5.)

The "ribbon" of precompressed material compressed between and discharged from the rollers 88 and 89 passes into an expansion or "breather" throat, generally indicated by the reference character 92. This throat permits a temporary accumulation of material therein, especially during a short lapse of time or a temporary pause of the plunger, necessary for the cycle of operation of the shuttle and wire twisting mechanism hereinafter described. This "breather" throat includes a forward transverse guide plate 93 pivoted at its upper end, as shown at 94, at a point adjacent the periphery of the roller 88 and forwardly of the space between the roller 88 and 89. Spaced rearwardly from the guide plate 93 is a second transverse guide plate 95 which, in turn, is pivoted at its upper end as shown at 96, between the two vertical wall plates 79. The guide plate 95 is pivoted at a point adjacent the periphery of the roller 89 and is located slightly to the rear of the space between the rollers 88 and 89. The lower or free ends of these guide plates are normally actuated toward one another by two oppositely disposed extension springs 97. The opposite ends of these springs are connected to lug extensions 98 and 99 secured to the respective plates 95 and 93. These lugs 98 and 99 project through the respective arcuate slots 100 and 101 located in the wall plates 79. Two other springs 102 having one of their ends connected to the lugs 99 and the ends connected to the opposite wall plates 79 normally urge the plates to the full line position shown in Fig. 4 and the ends of the slots 100 and 101 determine the limits of the swinging movement of these guide plates. The guide plates 93 and 95 occupy a position directly over an opening 103 leading into the baling chamber 32 for guiding the material in pre-compressed or "ribbon" preparatory for the compression stroke of the plunger 41.

The rearward upper edge of the plunger 41 is provided with a cutting or shearing knife 104 which cooperates with a stationary transverse cutter bar 105 for shearing or cutting the "ribbon" of material on each rearward movement of the plunger.

The mechanism which automatically controls the actuation of the plunger 41 on a measured amount of material fed into the baling chamber will next be described.

Secured to one end of the shaft 91 outside the roller housing is a sprocket wheel 106 which is geared by means of a chain 107 to a second sprocket wheel 108. (See Figs. 2 and 3ª.) The sprocket wheel 108 is secured to a stub shaft 109 which is journaled in a bearing bracket 110 secured to the main frame. Secured to one end of the shaft 109 is a trip or cam 111. The trip or cam 111 is adapted to revolve in the path of a valve control lever 112. The lever 112 controls the main plunger control or master valve 113. The master valve 113 is suitably mounted on the main frame of the baler and is operatively connected with the plunger cylinder 53 and a source of hydraulic pressure in the manner hereinafter more fully described. (See Fig. 15.)

It will be obvious, however, from the above description that upon a predetermined rotation of the roller 85 in the operation of compressing and feeding the precompressed "ribbon" of material into the baling chamber, the cam or trip 111 will trip the valve lever 112 to energize the plunger cylinder 53 to actuate the plunger 41.

The peripheral surface movement of the roller 89, for example, may be approximately eighteen inches so that a "ribbon" of eighteen inches of compressed material is fed into the baling chamber on each rotation of the cam 111 to trip the valve lever 113 and actuate the plunger.

The shuttle mechanism

The shuttle or needle mechanism which conveys the wires across the baling chamber to the wire tying or twisting mechanism comprises a shuttle support, generally indicated by the reference character 114. This support includes a channel-like member having two flat horizontal triangular plates 115, a connecting slotted web 116 and a flange 117 for attaching the same to the side of the frame of the baler by bolts 119. (See Figs. 6, 7 and 8.) Secured to the outer surfaces of the plates 115 are upper and lower shuttle guide shoes 120 which, in turn, have longitudinally extending grooves 121 on their inner surfaces to guide and reciprocally receive therein a needle or shuttle, generally indicated by the reference character 122. This shuttle consists of two horizontally spaced apart and parallel members or needles, indicated generally by the reference character 123, which are rigidly secured together by two horizontally spaced and vertically extending bars 124 and 124'. Each of these needles consists of opposed channel members 125 having outwardly projecting flanges 126 welded together in spaced relation by flat steel strips 127. These strips 127 are spaced inwardly from the outer edges of the flanges 126 so as to provide grooves substantially therearound for guiding the baling wires. The inner ends of each of these needles 123 are provided with oppositely disposed hardened and wire guiding grooved pointed plates 128 for presenting the wires to be twisted to the wire twisting pinions in the manner well understood in the art.

Extending horizontally and positioned parallel to and centrally between the needles 123 is a pointed wire twisting mechanism trip rod 129. The outer end of this trip rod is rigidly secured to the vertical bar 124. The opposite side walls 37 of the baling chamber is provided with aligned apertures 130 to permit the transverse movement of the shuttle 122 across the baling chamber for conveying the wires there across to the wire tying or wire twisting mechanism mounted within the casing, generally indicated by the reference character 131. The wire tying mechanism 131 is secured to the outside of the baling chamber on the side thereof opposite the shuttle 122. The shuttle 122 is actuated across the baling chamber through the medium of a lever consisting of two contiguously arranged flat steel members 132. One end of each of these members 132 are pivoted, as shown at 133, between two apertured ears 134. The apertured ears 134 are welded to the central portion of the vertical bar 124 of the shuttle 122. The other ends of these members 132 are slightly spaced apart and are pivotally connected, as shown at 135, to the outer ends 136 of two inwardly diverging links 137. The inner ends of these links 137 are held vertically spaced apart by a spacer tube 138 and are pivotally attached thereto by a vertical bolt 139. The bolt 139 is supported on opposite brackets 140 secured to the frame of the baler.

The shuttle 122 is actuated by a hydraulic cylinder and piston, generally indicated by the reference character 141, which includes a cylinder 142 and a piston 143. One end of the cylinder 141 is pivoted on a bolt 144 between two spacer tubes 145 surrounding the bolt. The bolt is supported on two vertically spaced apart horizontal angle members 146 secured to the side structure of the baling chamber. The piston 143 is provided with a connecting rod 147 which has its outer end pivotally connected, as shown at 148, between the spaced lever members 132. Secured to the outer ends of each of the needle members 123 and in aligned vertical spaced apart relation are two wire guide pulleys 149. These pulleys are mounted in arcuate shields 150 and are journaled on bolts 151 carried by brackets 152 secured to each of the needle members 123. Trained about these pulleys 149 are baling wires 153 which extend from sources of wire supply carried by the baler and extends around and through the grooves in the edges of the needles and grooved points 128 in a manner well understood in the art.

The star wheel control

The mechanism which measures the size of the bale and synchronizes its control with the hydraulically actuated shuttle and wire tying or twisting mechanism will next be described. (See Figs. 9, 10, 11, 12, 13 and 14.)

This mechanism includes a star wheel 154 which is journaled on a bracket 155 secured to one side of the baler frame. A portion of the periphery extends through a slot in the side of the bale chamber in a manner well understood in the art. Secured below and to the star wheel is a sprocket wheel 156 which is geared to a second sprocket wheel 157 by a chain 157'. The sprocket wheel 157 is secured to the upper end of a stub shaft 158 which is journaled in a bearing bracket 159 secured to the side of the baler frame. Secured to the lower end of the shaft 158 is a rotatable trip cam 160. The trip cam has an arcuate recess 161 and an upwardly bevelled cam surface 162. The cam also has a radially projecting lug 163 which is provided with a camming surface 164 which lies tangent to a circle concentric with the axis of the cam 160. Secured to the side wall of the baler is a horizontally projecting plate 165. Reciprocally mounted in an aperture in the plate 165 below the cam 160 is a rod 166 which has a horizontal barrel portion 167 and a downwardly extending inwardly threaded sleeve 168 formed integrally therewith. Mounted in threaded engagement with the sleeve 168 is a connecting rod 169 which has its lower end pivotally connected as shown at 170 to a valve lever 171. The lever 171 operatively actuates or controls the shuttle control master valve, generally indicated by the reference character 172 mounted on one side of the baler frame. (See Figs. 9, 10, 11 and 12.)

The actuation of the shuttle is synchronized with the wire tying mechanism through the medium of the following described construction: Reciprocally mounted in the barrel 167 is a rod 167', to the inner end of which is secured two spaced apart apertured ears 173. The ears 173 are pivotally and slidably connected to a slot 174 by a pin 174' located in the lower end of the lever 175. The lever 175 consists of two flat pieces of steel with their lower ends secured together and their upper ends spaced apart and pivoted on a bolt 176 secured to the bracket 159. A spring 177 mounted on a bolt 176 normally urges the free end of the lever 175 and the rod 167' outwardly. The outer edge of the lever 175 normally lies in the path of the lug 163 of the cam 160 and during the cycle of operation of the cam, the lug 163 actuates the lever 175 and rod 167' inwardly from the path of a horizontal projecting lug 178. (See Figs. 10, 12 and 13). The lug 178 is secured to a vertical connecting rod 179 which has its upper end reciprocally mounted in an apertured bracket 180 secured to one side of the wire tying mechanism casing 131. The rod 179 is normally pressed downwardly by a spring 181 which surrounds the rod. Adjustably attached to the lower end of the rod 179 is a connection 182 which has a vertical slot 183 therein. Extending through the slot 183 is a pin 184 for pivotally and slidably connecting the rod 179 to the outer end of a crank 185, which is secured to one end of a wire tying drive shaft 186. The shaft 186 is one of the shafts on which one of the gears of the wire tying mechanism is mounted, as will hereinafter be more fully described.

The operation of the above is as follows: The operating parts shown in Figs. 9 and 10 are in their normal or home position with the shuttle 122 outside the baling chamber. When the star wheel 154 revolves toward the end of measuring a full bale of material, the lug 163 on the cam 160 will actuate the lever 175 inwardly and withdraw the rod 167' from beneath the lower edge of the lug 178. The rod 167' is withdrawn from the position shown in Fig. 10 to the position shown in Fig. 12. In this position the flat bottom surface of the cam 160 is still holding the connecting rod 166 and 169 downwardly. When the cam 160 rotates to the position shown in Figs. 11 or 13, the rods 166 and 169 are free to move upwardly with the valve lever 171. The lever 171 is normally actuated upwardly by a spring within the valve 172, the details of which will be later described. When the valve lever 171 is actuated, the hydraulic cylinder 142 is energized to actuate the shuttle across the baling chamber. When the shuttle enters the wire tying mechanism casing 131, the trip rod 129 carried by the shuttle trips the wire tying mechanism into operation. When the wire twisting mechanism is tripped into operation, the gear shaft 186 will be revolved, turning the crank 185. This, in turn, will raise the rod 179 and lug 178 preparatory to having the lower edge of the lug engage the rod 167'. The downward movement of the lug will force the rod 169 and the valve lever 171 downwardly to energize the cylinder 142 for returning the shuttle to its home position.

The wire tying mechanism

The wire tying or twisting mechanism herein disclosed is substantially like that disclosed in the co-pending application of Herman J. Altgelt, Serial No. 540,918, filed June 14, 1944, now Patent No. 2,610,573 on Hay Baler. This mechanism comprises briefly lower and upper gear shafts 186 and 187 respectively, journaled in suitable bearings in the casing 131. Secured to the respective shafts are gears 188. An intermediate gear 189 meshes with and operatively drives the gears 188. Formed integrally with the gear 189 is an intermittently driven clutch member 190. The gear 189 and intermittently driven clutch member 190 is journaled on a spindle or shaft 191. Journaled concentrically with the gear 189 is a continuously driven clutch member 192. Pivoted on the intermittently driven clutch member 190, as shown at 193, is a spring pressed roller pawl 194. Meshing with and operatively driven by the gears 188 are slotted wire twister pinions 195. Positioned below the pinions 195 are needle guide rollers 196. The clutch tripping mechanism includes a roller arm or trip lever 197 pivoted on a bolt 198. The roller 199 journaled on one end of the lever 197 is adapted to engage the pawl 194. Pivoted to one arm of the lever 197 is a horizontal trip member 200. The free end 200' of the trip member 200 lies in the path of the trip rod 129 of the shuttle 122. Formed integrally with the trip member 200 is an upwardly extending arm 201 which lies in the path of and is adapted to be engaged by a roller 201' journaled on a pin 202 carried by the gear 188 during a cycle of operation of the wire twisting mechanism. A spring 203 normally actuates the lever 197 in a counterclockwise direction, as viewed from Fig. 14. It will be obvious from the above description that upon each transverse movement of the shuttle across the baling chamber, the trip rod 129 will actuate the members 200 and 197 to engage the clutch members together and thereby start the wire twisting mechanisms into operation. For a more detailed description of the function and operation of this mechanism, reference to the previously mentioned co-pending application may be made.

*Hydraulic control*

In order to more clearly understand the construction and operation of all the hydraulic motors and control valve mechanisms, as well as the synchronized operation of these mechanisms with one another, we have diagrammatically illustrated all of these parts in Fig. 15 of the drawings. In this figure the plunger 41 is diagrammatically illustrated as being actuated by the hydraulic piston 52 and cylinder 53.

In connection with our improved hydraulic baler, we employ a main fluid reservoir, generally indicated by the reference character 204. Associated with the reservoir is a pump diagrammatically illustrated and generally indicated by the reference character 205. The pump, of course, is connected by a conduit 206 to the reservoir. Extending from the discharge side of the gear pump is a constant pressure conduit 207. The conduit 207 is provided with a more or less conventional type of relief valve, generally indicated by the reference character 208, which has its outlet side connected by suitable conduits 209 to the reservoir 204. The main or constant pressure conduit 207 is connected to an inlet port, as shown at 210, to the main plunger control valve 113. The main valve 113 is provided with a longitudinally extending bore 211. Reciprocally mounted in the bore 211 is a spool, generally indicated by the reference character 212. Communicating with the bore 211 through an outlet port 213 in the valve 113 is a conduit 214, which communicates, as shown at 215, with the rearward end of the plunger cylinder 53. Formed integrally with the spool 212 and located, as shown in the diagrammatic view in Fig. 15 of the drawings and located on each side of the inlet ports 210 and 213 respectively, are lands 216 and 217.

From the above description it will be seen that when the spool 212 is in the position shown in this figure, the fluid pressure from the pump 205 is circulated through the conduit 207 into the port 210 and from there into the bore 211 between the lands 216 and 217 to the outlet port 213 through the conduit 214 into the rearward end of the plunger cylinder 53 to actuate the plunger forwardly or to its home position.

Mounted in one end of the bore 211 in the valve 113 for normally actuating the spool 212 in one direction, is a compression spring 218.

Figure 2:
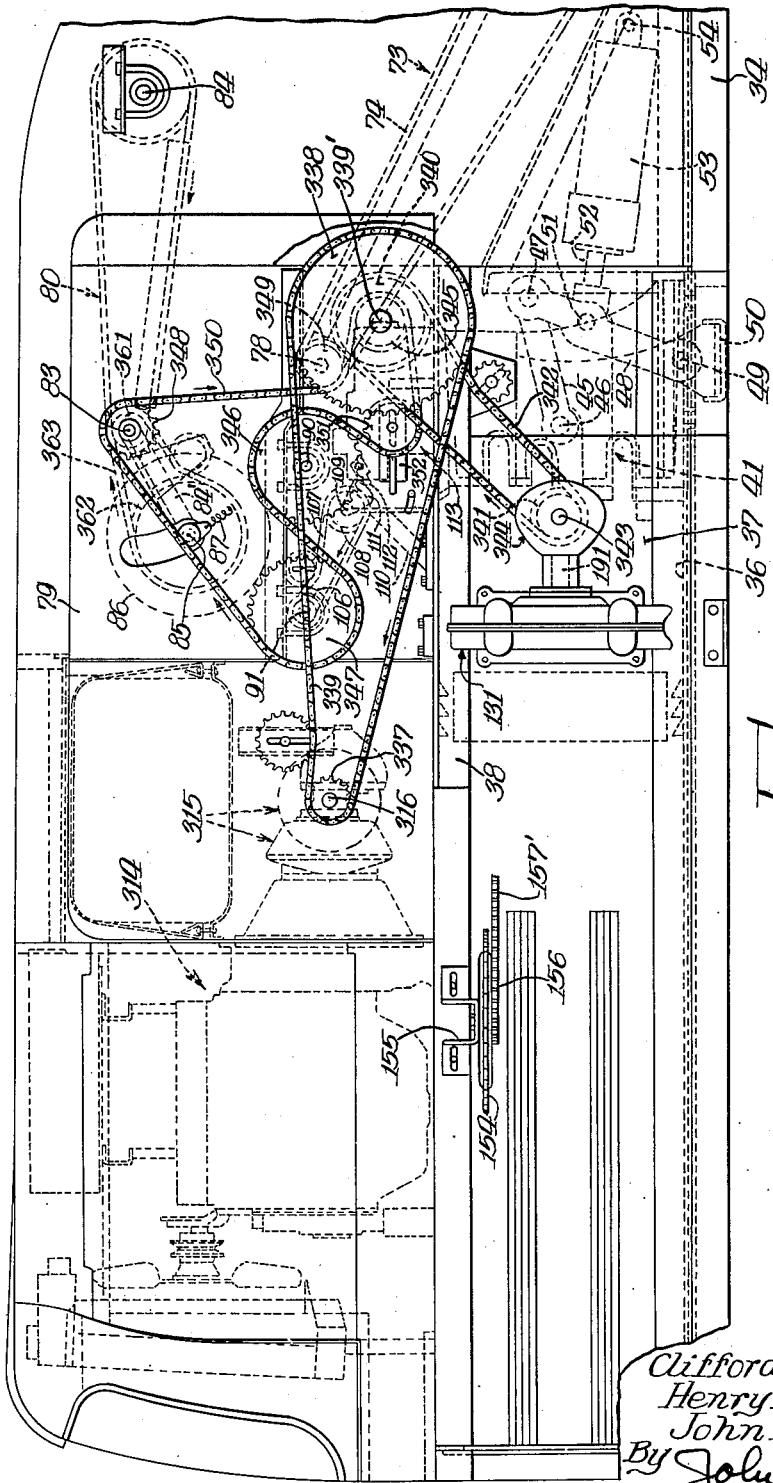
Fig. 2 is a similar enlarged fragmentary side elevational view showing the relative position of certain of the operative parts and the driving connections therefor.
Figure 3:
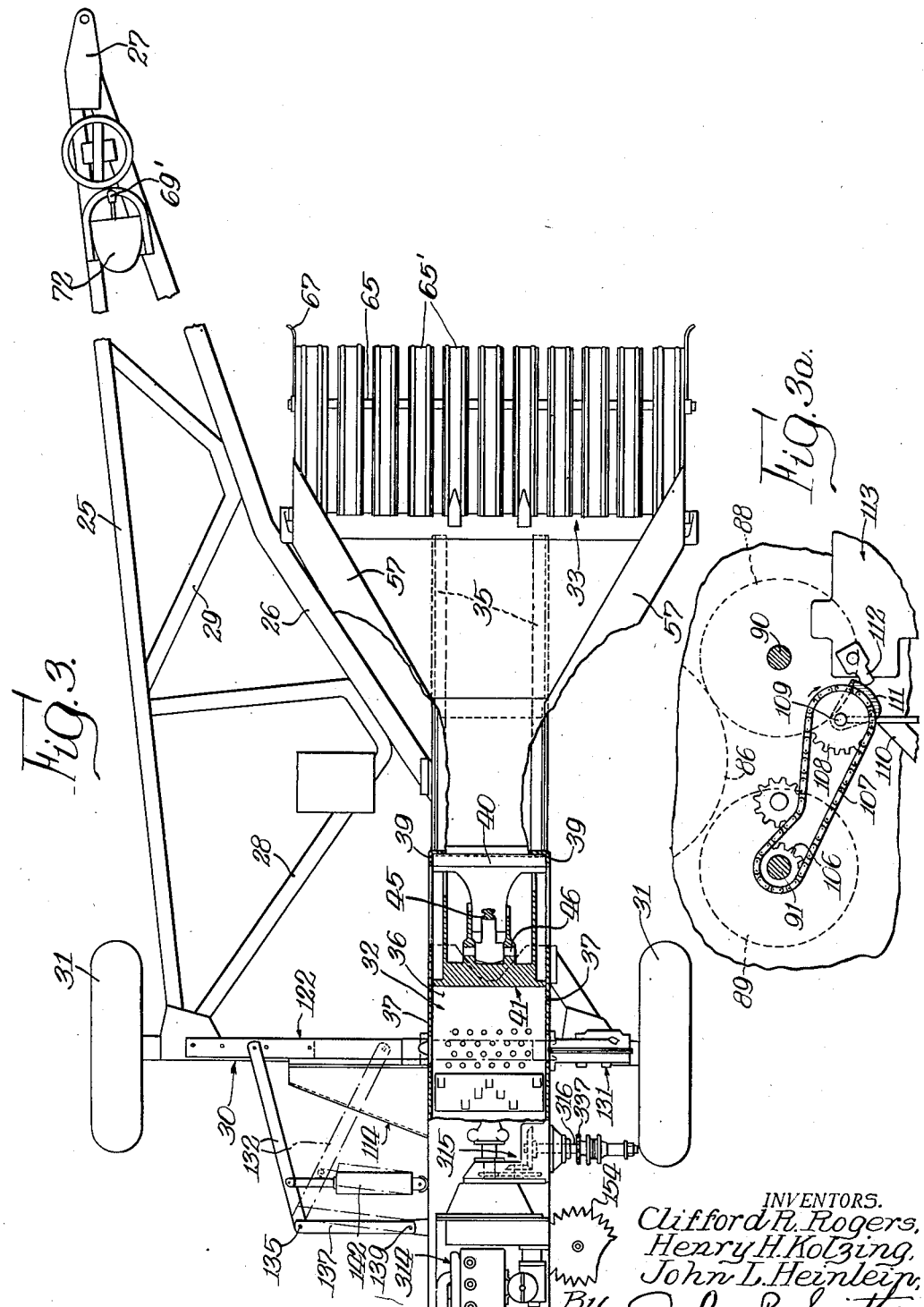
Fig. 3 is a fragmentary top plan view partly in cross section showing the position of certain of the parts.

When a predetermined amount of material is fed into the baling chamber, as measured by a predetermined rotation of the feed and compression roller 89, a trip or lever 112, shown in Fig. 2, and diagrammatically illustrated in Fig. 15, is actuated by the cam 111. When the lever 112 is actuated, the spring 218 actuates the spool 212 in a direction so that the land 217 covers the outlet port 213 and the inlet port 210 of the supply line 207 then communicates with an outlet port 219 in the valve 113 to permit the flow of fluid through a conduit 220 connected to the port 219. An extension of the conduit 220 is connected, as shown at 221, to a check valve, generally indicated by the reference character 222. The particular function of the check valve 222 is to prevent the plunger from moving on a compression stroke if the shuttle is in a position inside the baler chamber. The check valve 222 is provided with a longitudinal bore 223 in which is reciprocally mounted a spool 224. One end of the spool 224 projects outwardly from the valve 222, as shown at 225, so as to be actuated by a trip 226 carried by the shuttle 122. The actuation of this trip by the shuttle mechanism will be hereinafter more fully described. The conduit 220 communicates with a passageway 227 which, in turn, communicates with the bore 223 of the valve 222. Communicating with the bore 223 through an outlet port 228 is a conduit 229. The conduit 229 communicates, as shown at 230, with the forward end of the plunger cylinder 53. Mounted on the inner end of the spool 224 is a land 226' which is adapted to cover and uncover the port 228. Spaced from the land 226' is a second land 229' which is adapted to open or close a return port 230'. This port 230', in turn, communicates with a conduit 231 which forms the return through a connecting conduit 232 to the reservoir 204.

Synchronized with the operation of the plunger 41 and conveying the upper and lower band of wires across the baling chamber through transverse slots 42 and 44 in the rearward end of the plunger, is the shuttle mechanism 122 diagrammatically shown in this Fig. 15. This shuttle mechanism is connected to and actuated across the baling chamber by the hydraulic mechanism 141. Operatively connected to the shuttle cylinder 142 is a shuttle cylinder valve, generally indicated by the reference character 172. Extending longitudinally of the valve 172 is a bore 233. Reciprocally mounted in the bore 233 is a spool 234. Communicating with the bore 233 through an inlet port 235 is a pressure or supply conduit 236 of constant pressure. The other end of the conduit 236 is connected, as shown at 237, to the constant pressure conduit 207. Communicating with the bore 233 through an outlet port 238 is a conduit 239. The other end of the conduit 239 is connected, as shown at 240, to one end of the shuttle cylinder 141.

From the above description it will be obvious that when the spool 234 of the valve 172 is in the position shown in the diagrammatic view Fig. 15, the constant or high pressure conduit lines 207 and 236 will actuate the shuttle mechanism 122 outwardly or away from the baling chamber or to the position shown in this figure.

Secured to and located on the opposite sides of the inlet and outlet ports 235 and 238 respectively and secured to the spool 234, are lands 241 and 242 respectively. Upon the actuation of the spool 234, it will be observed that the lands 241 and 242 may simultaneously uncover the respective inlet and outlet ports 235 and 238 or they may alternately close either of said ports for the purpose hereinafter disclosed.

The shuttle 122 is actuated to bind the bale in cooperation with the knotting mechanism when a sufficient amount of hay or other material is compressed by the plunger as hereinbefore described. The trip for the control of this shuttle mechanism is the star wheel 154 which, in turn, actuates a shuttle trip cam 160. (See Figs. 9, 10, 11 and 12.) This trip cam 160, in turn, is operatively related, as previously described, to the lever 171 which is connected to the valve 172. The lever 171 has its lower end, as shown at 243, operatively connected to the spool 234.

When the spool 234 of the valve 172 is shifted by the tripping mechanism of the star wheel, the land 241 of the spool 234 is shifted to the left of the intake port 235 as viewed in Fig. 15 of the drawings, so as to communicate the supply or constant pressure line 236 with an outlet port 244 of the valve member 172. This outlet port 244 is connected by a conduit 245. The other end of the conduit 245, as shown at 246, is connected to a check valve 247. The check valve 247 permits the shutter 122 to enter the baling chamber when the plunger 41 has reached the end of its cutting stroke. The check valve 247 has an outlet port 252 communicating with a bore 248 which, in turn, is connected by an extension 253 and conduit 254 to the outer end of the shuttle cylinder 141 as shown at 255. The spool 249 is actuated outwardly to cover the outlet port 252 of the valve 247 by a compression spring 256 so that the land 250 covers the outlet port 252 of the valve 247. The land 251 only partially covers a return or outlet port 257 so as to prevent back pressure and allow a partial escape of the fluid pressure. This return port is connected by a conduit 258 which, in turn, is connected to the conduit 232 to the reservoir 204. The spool 249 of the check valve 247 is actuated on each reciprocation on the plunger 41 by an annularly disposed bracket or arm 259 which has one end attached to the plunger, as shown at 260. This bracket 259 moves in the path of and engages a lever 261 which is pivoted, as shown at 262, to the valve housing 263. One arm of the lever 261, as shown at 264, engages one end of the spool 249 to actuate the same.

From the above description it will be seen that upon each actuation of the plunger, the spool 249 of the valve 247 is actuated, but such actuation does not permit the flow of the fluid pressure to the conduits 245 and 253 until such time as the star wheel actuates the lever 171 and spool 234 of the shuttle valve 172. When the shuttle mechanism 122 reaches its innermost stroke through the baling chamber, the fluid pressure in the line 253 is permitted to be relieved by a passageway 265 which communicates with a spring pressed pawl valve, generally indicated at 266. This release valve 266 communicates through a second passageway 267 in the valve 247 to the inlet port 252 of the valve so that the excess pressure is free to pass through the bore and escape port 257 to the return conduits 258 and 232 and then to the reservoir 204.

In order to be positively sure that the shuttle mechanism will not be actuated before the plunger 41 completes the inward stroke or inner position of its compression stroke on the completion of forming a complete bale, we have provided a safety valve, generally indicated by the reference character 267' which is formed integrally with and as a part of the shuttle valve 172. This safety valve 267' consists of two spaced apart lands 268 and 269 which are mounted on and form part of the spool 234 of the shuttle valve 172. These lands 268 and 269 reciprocate in a longitudinal bore 270 in the valve 267' which is a continuation of and in alignment with the bore 233 of the shuttle valve 172. This bore 270 communicates with an inlet port 271 and in turn is connected by a conduit 272 which, in turn, communicates as shown at 273, to a third check valve 274 hereinafter more fully described. The bore 270 of the safety valve 267' has an escape bore or passageway 275 which, in turn, communicates with a longitudinally extending passageway 276 in the valve member 172. This passageway 276 is connected to a return conduit 278 which, in turn, connects with the reservoir 204. On the inward stroke of the shuttle mechanism, the pressure in the conduit on the inner side of the cylinder 141 is released through the conduit 239, port 238 at an escape port 279 which, in turn, communicates with the passageway 276 of the shuttle valve 172 from where it is passed through the conduit 278 to the reservoir 204 when the land 242 moves to the left as shown in the diagrammatic drawing and uncovers the port 279.

In order to permit the pressure to be relieved on the outer side of the shuttle cylinder 141 to permit the return of the shuttle to its outermost position, the liquid is discharged from the outer end of the cylinder 141 through the conduit 254 to the conduit 253 and thence into the check valve 247. Then the liquid is passed through the valve 247, through the port 246, into and through the conduit 245. From the conduit 245 it is passed through the port 244 into the bore 233 of the valve 172 from where it is passed through the escape port 280 through the passageway 276 of the shuttle valve 172 from where it is passed into the return conduit 278 to the reservoir 204. The spool 234 is normally actuated to the left, as viewed in the diagrammatic view by a compression spring 281.

In order to prevent the backlash of the tripping star wheel caused by the compression and expansion or breathing of the material to prematurely trip the shuttle mechanism before the complete cycle or innermost position of the plunger is attained, we have provided the supplemental check valve 274. This supplemental check valve 274 has a longitudinal bore 282 therein in which a reciprocable spool 283 is mounted. Communicating with the bore 282 is an inlet port 284 which communicates with the constant pressure line of the conduit 236. The bore 282 communicates with a passageway 285 which, in turn, is connected to the conduit 272. The spool 283 is provided with two spaced apart lands 286 and 287. The land 286 is adapted to cover and uncover the outlet port 285 communicating with the conduit 272. The land 287 is adapted to partially cover an outlet passageway 288 which, in turn, is connected to return conduits 289 and 232 to the reservoir 204. The spool is normally pressed to the right, as shown in the diagrammatic view, by compression spring 290. The spool 283 is normally actuated by a pivoted lever, generally indicated by the reference character 291. The lever 291 is pivoted, as shown at 292, to a valve housing 293 and angularly disposed arm 294, formed integrally with the lever 291 is located in the path of and adapted to be engaged by the bracket arm 259 carried by the plunger 41.

From the above description it will be observed that upon every reciprocation of the plunger, especially when it reaches its innermost end of the compression stroke, the bracket 259 will actuate the spool lever 291 to uncover the outlet port 285 and permit the full pressure of the pressure line 236 to pass through the conduit 272 from where it will pass into the inlet port 271 of the safety valve 267' between the lands 268 and 269 of the spool 234. This arrangement maintains the spool 234 in the position shown in the diagrammatic view and thereby prevents the actuation of the shuttle mechanism only at such times as the plunger is in its innermost position.

The mechanism for reversing the operation of the plunger cylinder, i. e., to have the plunger automatically reverse its direction at the completion of each of its strokes and to provide a balance for this mechanism, we have provided within the framework of the valve casing 113 which controls the operation of the plunger 41, a reciprocable plunger reversing spool 295. Cooperating and synchronized with this reversing plunger cylinder spool 295, we have also provided a similar reversing shuttle cylinder spool, generally indicated by the reference character 296. Each of these spools are reciprocally mounted in their respective bores 297, which are located parallel with respect to one another and spaced apart with respect to each other. The spools 295 and 296 are urged in one direction by springs 297' mounted within the respective bores 297. The spools 295 and 296 have lands 298 and 299 located on their opposite ends with the intermediate portion considerably reduced in diameter as shown at 300. The intermediate portion of these spools 295 and 296 have disc-like flanges 301 and 302 respectively, which are adapted to move into the path of and engage a pivoted lever 303. The lever 303 is pivoted, as shown at 304, to the valve casing 113 and is provided with a locking lug 305, which is adapted to engage an annular recess 306 in the lower end of the spool 212, for normally locking the spool when the same has been actuated by the trip lever 112 upon the completion or feeding of a predetermined amount of material into the baling chamber. This lever, 112, as heretofore described, controls the valve which energizes the plunger cylinder to actuate the plunger to compress the material thus fed. The locking lug 305 of the lever 303 is normally actuated into the locking groove 306 of the spool 212 by a compression spring 307. On the completion of the inner or compression stroke of the plunger 41 with the spool 212 in its uppermost position, the land 216 moves upwardly and communicates the inlet port 210 and outlet port 219 so that the pressure passes through the conduit 220 into a branch extension conduit 308 into an inlet port 309 below the land 299 of the spool 295. This excess or balancing pressure actuates the spool 295 upwardly against the tension of the spring 297' thereby urging the flange 301 on the spool 295 upwardly to engage the lever 303, thereby disengaging the locking lug 305 from the annular recess 306 of the spool 212 and thereby free the spool 212 for completing one cycle of operation of the plunger. It will, of course, be understood that in each successive reciprocation of the plunger, the valve mechanism 113 and the reversing plunger cylinder spool mechanism 295 operates in the same cycle.

In order to balance the operation of the reversing cylinder spool 295 to permit the escape of oil in the spring chamber 297 and permit the free reciprocation of the spool 295 against the spring 297', an escape port 310 communicates with the conduit 311 which is an extension of the conduit 254.

In order to coordinate and synchronize the operation of the shuttle mechanism with that of the operation of the plunger mechanism, the reversing shuttle cylinder spool 296 functions in a somewhat similar manner to that of the reversing plunger spool 295.

At the completion of the inward stroke of the shuttle mechanism while the plunger is in its rearmost compression stroke at the time or conclusion following the tying of the bale, the lands 241 and 242 of the spool 234 will move to the right, as viewed in Fig. 15 of the drawings, so as to cover the outlet port 238 and communicate the inlet port and outlet port 244 from where the pressure will pass through the conduit 245 through the valve 247 into the conduit 253. As the pressure builds up in the conduit 245, it will be exerted along an extension 312 which communicates with an inlet port 313. This port communicates with the chamber below the land 299 of the spool 296, thereby actuating the spool 296 against the compression spring 297'. Simultaneously with this actuation, the flange 302 engages the lever 303 to disengage the lug 305 from the annular slot 306 in the spool 212 so as to permit the spool 212 to return to the position shown in Fig. 15 of the drawings and thereby prepare the plunger valve for the next cycle of operation of the plunger cylinder.

From the above description it will be readily seen that the valves for controlling the operation of the shuttle and the plunger mechanisms are synchronized not only with respect to the reversing mechanisms of each of these reciprocating parts, but a series of check valves communicates with these principal valves making it possible for both the plunger and the shuttle mechanism to perform their individual function in a coordinating synchronized method of operation so that under no circumstances is there likely to be an interrupted operation or colliding of these operating parts. The mechanism herein described not only insures a positive and fully hydraulically operated baling press, but also reduces the number of operating parts heretofore used to a minimum whereby the over-all weight of the baler is approximately reduced fifty percent (50%).

*Engine mounting and drive*

The present invention embodies a novel driving arrangement for driving the pre-compression rollers and other movable elements of the baler. This novel drive includes an internal combustion engine generally indicated by the reference character 314. This engine is located to the rear of, above and directly in longitudinal alignment with the baling chamber and plunger of the baler. The engine is provided with a longitudinally extending crankshaft which is operatively connected with suitable transmission and reduction bearing located within the housing, generally indicated by the reference character 315. Secured to one of the gears within the housing 315 is a transverse drive shaft 316. Secured to the shaft 316 is a drive sprocket wheel 337 which is geared to a driven sprocket wheel 338 by a drive chain 339. The driven sprocket wheel 338 is secured to a stub shaft 339' which is journaled in suitable bearings carried by the baler frame. Secured to the shaft 339' is a second sprocket wheel 340 geared by a chain 342 to a sprocket wheel 341. The sprocket wheel 341 is secured to one end of a shaft 343. Secured to the inner end of the shaft 343 is a beveled gear (not shown) which meshes with a second beveled gear (not shown), both of which are within the gear housing 344. The latter beveled gear is secured to the shaft 191 of the continuously driven clutch member 192, of the wire tying mechanism. (See Fig. 14.) Secured to the shaft 339' is a sprocket wheel 345. Secured to the compression roller shafts 90 and 91 are sprocket wheels 346 and 347 respectively. Secured to the shaft 83 is a sprocket wheel 348. Secured to the shaft 78 is a sprocket wheel 349. Trained about the sprocket wheels 345, 346, 347, 348 and 349 and adapted to travel in a direction indicated by the arrows is a flexible drive chain 350. The idler belt tightener sprocket wheel 351 is adjustably supported on a bracket 352 secured to the frame of the baler. (See Fig. 2.) The chain drives thus far described are all located on the right hand side of the baler. Secured to the opposite ends of the shaft 61 are sprocket wheels 353 which operatively drive, by chains 354, opposite sprocket wheels 355 secured to the opposite end of the pick-up shaft 65. (See Fig. 4.)

Secured to the left hand end of the shaft 61 is a gear 356 which meshes with and drives a second gear 357. Secured to the gear 357 is a pulley 358 which is geared by a belt 359 to a pulley 360 secured to one end of the reel shaft 76. Secured to the left end of the shaft 83 is a sprocket wheel 361 which operatively drives a sprocket wheel 362 by a chain 363. The sprocket wheel 362 is secured to the shaft 85 of the floating compression roller 86.

Summarizing the advantages and functions of operation of our improved fully automatic and hydraulically operated baling press, it will be obvious that by precompressing the material into ribbon-like form preparatory to discharging the same into the baling chamber, a great portion of the function heretofore performed by the plunger is eliminated and thereby increases the efficiency of the press. It will be further noted that by arranging the gathering, conveying and power plant in longitudinal alignment with the baling chamber and plunger, the size and weight of the baling press is reduced up to fifty percent over the conventional type of baler. The synchronized operation of the plunger and shuttle mechanisms and the various checks interposed in the hydraulic system effect a substantially fool-proof operating baler.

It will also be noted that by providing a "breather" throat below the two horizontal compression rollers, a sufficient flexibility is permitted to afford a temporary accumulation of material during momentary intermission required for the shuttle to complete its cycle of operation of tying the wires.

While in the above specification we have described one embodiment which our invention may assume in practice, it will, of course, be understood that modification may be made without departing from the spirit and scope of the invention as expressed in the following claims.

What we claim as our invention and desire to secure by Letters Patent is:

1. A pick-up baler comprising a main frame, a longitudinally extending baling chamber frame having a baling chamber therein and mounted on said main frame, a forwardly diverging gathering frame secured to said chamber frame, transversely extending and horizontally spaced apart compression rollers positioned above said chamber for receiving the material to be baled from said gathering frame and for forcing said material into said chamber and oppositely disposed yielding means positioned below and adjacent the periphery of said rollers for temporarily accumulating the material therebetween.

2. A pick-up baler comprising a main frame, a longitudinally extending baling chamber frame having a baling chamber therein and mounted on said main frame, a forwardly diverging gathering frame secured to said chamber frame, transversely extending and horizontally spaced apart compression rollers positioned above said chamber for receiving the material to be baled from said gathering frame and for forcing said material into said chamber, a floating compression roller positioned above the space between said first named rollers, and oppositely disposed yielding means positioned below and adjacent the periphery of said rollers for temporarily accumulating the material therebetween.

3. A pick-up baler comprising a main frame, a longitudinally extending baling chamber frame having a baling chamber therein and mounted on said main frame, a forwardly diverging gathering frame secured to said chamber frame, transversely extending and horizontally spaced apart compression rollers positioned above said chamber for receiving the material to be baled from said gathering frame and for forcing said material into said chamber, and yieldable guide plates pivoted below and adjacent each of said rollers for guiding the material into said chamber.

4. A straight-in-line pick-up baler comprising a main frame having a longitudinally extending baling chamber thereon, a gathering and pick-up means located forwardly and in longitudinal alignment with said chamber, a reciprocal plunger located in said chamber, a lever pivoted to said frame and operatively connected to said plunger and a hydraulic cylinder unit having one end operatively connected to an intermediate portion of said plunger lever and the other end connected to said frame and located below said gathering means for actuating said plunger.

5. A straight-in-line pick-up baler comprising a main frame having a longitudinally extending baling chamber thereon, a gathering and pick-up means located forwardly and in longitudinal alignment with said chamber, a reciprocal plunger located in said chamber, two horizontally spaced apart and transversely extending compression rollers positioned above said chamber, a floating roller journaled on said frame and positioned above and at a point between said first named rollers, spring actuated plates located below said first named rollers for guiding the material into said chamber, and a hydraulic means operatively connected between said plunger and said frame and located below said gathering means for actuating said plunger.

6. A straight-in-line pick-up baler comprising a main frame having a longitudinally extending baling chamber thereon, a gathering and pick-up means located forwardly and in longitudinal alignment with said chamber, a reciprocal plunger located in said chamber, two horizontally spaced apart and transversely extending compression rollers positioned above said chamber, a floating roller journaled on said frame and positioned above and at a point between said first named rollers, spring actuated plates located below said first named rollers for guiding the material into said chamber, a hydraulic means operatively connected between said plunger and said frame and located below said gathering means for actuating said plunger, and means responsive to the rotation of one of said rollers to energize said hydraulic means and actuate said plunger.

7. A straight-in-line pick-up baler comprising a main frame having a longitudinally extending baling chamber thereon, a gathering and pick-up means located forwardly and in longitudinal alignment with said chamber, a reciprocal plunger located in said chamber, two horizontally spaced apart and transversely extending compression rollers positioned above said chamber, a floating roller journaled on said frame and positioned above and at a point between said first named rollers, spring actuated plates located below said first named rollers for guiding the material into said chamber, a hydraulic means operatively connected between said plunger and said frame and located below said gathering means for actuating said plunger, and means responsive to an amount of material fed between said rollers for controlling the actuation of said plunger.

8. A baler comprising a frame having a baling chamber therein, a reciprocal plunger mounted in said chamber, compression feed rollers positioned above said chamber, and means responsive to the rotation of one of said rollers and operatively related to said plunger for controlling the actuation of said plunger.

9. A baler comprising a frame having a baling chamber therein, a reciprocal plunger mounted in said chamber, compression feed rollers positioned above said chamber, and means responsive to a predetermined peripheral rotation of one of said rollers and operatively related to said plunger for controlling the actuation of said plunger.

10. A baler comprising a frame having a baling chamber therein, a reciprocal plunger mounted in said chamber, compression feed rollers positioned above said chamber, a hydraulic cylinder operatively connected to said plunger, a valve for controlling said cylinder, and means actuated by one of said rollers for controlling said valve.

11. A straight-in-line pick-up baler comprising a main frame having a longitudinally extending baling chamber thereon, a gathering and pick-up means located forwardly and in longitudinal alignment with said chamber, a reciprocal plunger located in said chamber, a lever pivoted to said frame, a link operatively connecting said plunger with the free end of said lever, and a hydraulic mechanism having one end operatively connected to an intermediate portion of said lever and the other end connected to said frame and located below said gathering means for actuating said plunger.

12. A straight-in-line pick-up baler comprising a main frame having a longitudinally extending baling chamber thereon, a gathering and pick-up means located forwardly and in longitudinal alignment with said chamber, a reciprocal plunger located in said chamber, a lever pivoted to said frame, a link operatively connecting said plunger with said lever, a hydraulic mechanism operatively connected between said lever and said frame and located below said gathering means for actuating said plunger, means carried by said frame for pre-compressing and feeding material into said chamber, and operative means responsive to the movement of said last named means for controlling the actuation of said hydraulic mechanism.

13. A straight-in-line pick-up baler comprising a main frame having a longitudinally extending baling chamber thereon, a gathering and pick-up means carried by said frame and located in longitudinal alignment with said chamber, a reciprocal plunger located in the longitudinal center of said chamber, and a power plant located rearwardly of and above and in substantially a longitudinal vertical plane in alignment with said baling chamber for actuating said plunger.

14. A straight-in-line pick-up baler comprising a main frame having a longitudinally extending baling chamber thereon, a gathering and pick-up means carried by said frame and located in longitudinal alignment with said chamber, a reciprocal plunger located in said chamber, a hydraulic mechanism carried by said frame and operatively connected between said frame and said plunger, a source of fluid pressure carried by said frame and operatively connected to said hydraulic mechanism, and an engine located rearwardly above in substantially the same longitudinal plane of said chamber for furnishing power to said source of fluid pressure.

15. A straight-in-line pick-up baler comprising a main frame having a longitudinally extending baling chamber thereon, a gathering and pick-up means carried by said frame and located in longitudinal alignment with said chamber, a reciprocal plunger located in said chamber, a lever pivoted to said frame, a link operatively connecting said plunger with the free end of said lever, a hydraulic mechanism pivoted at one end to said frame and at the other end to said lever, a fluid pressure pump mounted on said frame for furnishing fluid pressure to said hydraulic mechanism, and an engine mounted on said frame on a longitudinal line with and positioned adjacent the rear end of and above said baling chamber for actuating said pump.

16. A baler comprising a frame having a baling chamber therein, a reciprocal plunger mounted in said chamber, a shuttle mechanism mounted on one side of said baling chamber, a wire tying mechanism mounted on the other side of said chamber, means for actuating said plunger, said shuttle mechanism and said wire tying mechanism, and operative means for synchronizing and controlling the operation of the plunger, the shuttle and wire tying mechanism by each other during the cycle of operation of either one of them.

17. A baler comprising a frame having a baling chamber therein, a reciprocal plunger mounted in said chamber, a shuttle mechanism mounted on one side of said baling chamber, a wire tying mechanism mounted on the other side of said chamber, means for actuating said plunger, said shuttle mechanism and said wire tying mechanism, means for controlling the operation of said plunger by the material fed into said chamber, means for controlling the actuation of said shuttle by said plunger, means for controlling the return stroke of said plunger by said shuttle, and means for controlling the return stroke of said plunger and said shuttle by said wire tying mechanism.

18. A baler comprising a frame having a baling chamber therein, a reciprocal plunger mounted in said chamber, a shuttle mechanism mounted on one side of said baling chamber, a wire tying mechanism mounted on the other side of said chamber, means for actuating said plunger, said shuttle mechanism and said wire tying mechanism, means for controlling the operation of said plunger by the material fed into said chamber, hydraulically responsive means for controlling the actuation of said shuttle by said plunger, hydraulically responsive means for controlling the actuation of the plunger in one direction by said shuttle, and means for controlling the operation of said plunger and said shuttle by said wire tying mechanism.

19. A baler comprising a frame having a baling chamber therein, a reciprocal plunger mounted in said chamber for compressing the material therein, a shuttle mechanism mounted on said frame, a wire tying mechanism mounted on said frame and cooperating with said shuttle mechanism for tying bands of wire around the material in said chamber, separate hydraulic means for actuating said plunger and said shuttle mechanism, power means for driving said wire tying mechanism, and hydraulically controlled means for synchronizing the operation of said plunger, said shuttle and said wire tying mechanism.

20. A baler comprising a frame having a baling chamber therein, a reciprocal plunger mounted in said chamber for compressing the material therein, a shuttle mechanism mounted on said frame, a wire tying mechanism mounted on said frame and cooperating with said shuttle mechanism for tying bands of wire around the material in said chamber, a hydraulic cylinder and piston mounted on said frame for actuating said plunger, a hydraulic cylinder and piston mounted on said frame for actuating said shuttle, a pump mounted on said frame for supplying fluid under pressure to said hydraulic cylinders and pistons, an engine mounted on said frame for driving said pump and actuating said tying mechanism, and means for synchronizing the operation of said shuttle, said plunger and said wire tying mechanism.

21. A baler comprising a longitudinally extending frame having a baling chamber therein, a plunger mounted in said chamber, means carried by said frame above said chamber for precompressing the material to be baled prior to discharging the same into said chamber, and oppositely disposed yielding means located in close proximity to said chamber and between said first named means and said chamber for temporarily accumulating the material therein.

22. A pickup baler comprising a main frame, a longitudinally extending baling chamber frame having a baling chamber therein and mounted on said main frame, a forwardly diverging gathering frame secured to said chamber frame, transversely extending and horizontally spaced apart compression rollers positioned above said chamber for receiving the material to be baled from said gathering frame and for forcing said material into said chamber, and oppositely disposed yielding means positioned below and adjacent the space between said rollers for temporarily accumulating and guiding the material into said chamber.

23. A baler comprising a frame having a baling chamber therein, a reciprocable plunger mounted in said chamber, a shuttle mechanism mounted on said frame, a wire tying mechanism mounted on said frame and cooperating with said shuttle, means for actuating said plunger, said shuttle mechanism and said wire tying mechanism, means for controlling the operation of said plunger by the material fed into said chamber, means for controlling the actuation of said shuttle by said plunger, means for controlling the return stroke of said plunger by said shuttle, and means for controlling the return stroke of said plunger and said shuttle by said wire tying mechanism.

24. A baler comprising a frame having a baling chamber therein, a reciprocable plunger mounted in said chamber, a shuttle mechanism mounted on said frame, a wire tying mechanism mounted on said frame and cooperating with said shuttle, means for actuating said plunger, said shuttle mechanism and said wire tying mechanism, means for controlling the operation of said plunger by the material fed into said chamber, hydraulically responsive means for controlling the operation of said shuttle by said plunger, hydraulically responsive means for controlling the actuation of the plunger in one direction by said shuttle, and means for controlling the operation of said plunger and said shuttle by said wire tying mechanism.

CLIFFORD R. ROGERS.
HENRY H. KOLZING.
JOHN L. HEINLEIN.

References Cited in the file of this patent

UNITED STATES PATENTS

| Number | Name | Date |
|---|---|---|
| 346,827 | Romans | Aug. 3, 1886 |
| 367,489 | Wood | Aug. 2, 1887 |
| 775,481 | Thomas | Nov. 22, 1904 |
| 787,008 | Taylor | Apr. 11, 1905 |
| 909,275 | Besser | Jan. 12, 1909 |
| 930,083 | Rahm | Aug. 3, 1909 |
| 949,767 | House | Feb. 22, 1910 |
| 1,495,276 | Theobald | May 27, 1924 |
| 1,788,620 | Elliott | Jan. 13, 1931 |
| 2,068,886 | MacDonald | Jan. 26, 1937 |
| 2,186,030 | Lester | Jan. 9, 1940 |
| 2,298,852 | Ward | Oct. 13, 1942 |
| 2,334,982 | Arnoldi et al. | Nov. 23, 1943 |
| 2,349,847 | Crumb | May 30, 1944 |
| 2,381,620 | Russell | Aug. 7, 1945 |
| 2,396,720 | Nolt | Mar. 19, 1946 |
| 2,417,309 | Lisle et al. | Mar. 11, 1947 |
| 2,507,540 | Nolt | May 16, 1950 |

FOREIGN PATENTS

| Number | Country | Date |
|---|---|---|
| 457,955 | Germany | Mar. 27, 1928 |